(12) United States Patent
Fay (10) Patent No.: US 10,721,064 B2
(45) Date of Patent: Jul. 21, 2020

(54) MODULAR KEY EXCHANGE FOR KEY AGREEMENT AND OPTIONAL AUTHENTICATION

(71) Applicant: NXP B.V., Eindhoven (NL)

(72) Inventor: Bjorn Fay, Schleswig-Holstein (DE)

(73) Assignee: NXP B.V., Eindhoven (NL)

( * ) Notice: Subject to any disclaimer, the term of this patent is extended or adjusted under 35 U.S.C. 154(b) by 233 days.

(21) Appl. No.: 15/993,186

(22) Filed: May 30, 2018

(65) Prior Publication Data
US 2019/0372764 A1 Dec. 5, 2019

(51) Int. Cl.
*H04L 9/08* (2006.01)
*H04L 9/30* (2006.01)
*H04L 9/32* (2006.01)

(52) U.S. Cl.
CPC .......... *H04L 9/0863* (2013.01); *H04L 9/0841* (2013.01); *H04L 9/30* (2013.01); *H04L 9/3263* (2013.01)

(58) Field of Classification Search
CPC ....... H04L 9/0863; H04L 9/3263; H04L 9/30; H04L 9/0841; H04L 9/0844
See application file for complete search history.

(56) References Cited

U.S. PATENT DOCUMENTS

| | | | | |
|---|---|---|---|---|
| 7,694,141 | B2 * | 4/2010 | Lauter | H04L 9/0844 380/283 |
| 2011/0208970 | A1 * | 8/2011 | Brown | H04L 9/0844 713/176 |
| 2015/0200774 | A1 * | 7/2015 | Le Saint | H04L 9/0819 713/171 |
| 2016/0065370 | A1 * | 3/2016 | Le Saint | H04L 9/0841 713/155 |

OTHER PUBLICATIONS

Blake-Wilson, Simon et al.; "Unknown Key-Share Attacks on the Station-to-Station (STS) Protocol;" International Workshop on Practice and Theory in Public Key Cryptography, Mar. 1, 1999, pp. 154-170, Springer, Berlin, Germany.

Song, Boyeon et al.; "Two-Pass Authenticated Key Agreement Protocol with Key Confirmation;" International Conference on Computer Analysis of Images and Patterns; CAIP 2017, Jan. 1, 2000, pp. 237-249, vol. 1977, Springer, Berlin, Heidelberg, Germany.

(Continued)

*Primary Examiner* — Khoi V Le (57) ABSTRACT

Various embodiments relate to a key protocol exchange that provide a simple but still secure key exchange protocol. Security of key exchange protocols has many aspects; providing and proving all these properties gets harder with more complex protocols. These security properties may include: perfect forward secrecy; forward deniability; key compromise impersonation resistance; security against unknown key share attack; explicit or implicit authentication; key confirmation; protocol is (session-)key independent; key separation (different keys for encryption and MACing); extendable, e.g. against DOS attacks . . . (e.g. using cookies, . . . ); support of early messages; small communication footprint; and support of for public-key and/or password authentication.

20 Claims, 1 Drawing Sheet

(56) References Cited

OTHER PUBLICATIONS

Zhao, Zhenguo; "An Efficient Anonymous Authentication Scheme for Wireless Body Area Networks Using Elliptic Curve Cryptosystem;" Journal of Medical Systems, Feb. 1, 2014, pp. 1-7, vol. 38:13, Springer Science + Business Media, New York, NY, USA.
Putman [TLS] New I-D draft-putman-tsl13-preshared-dh-00.txt (Jan. 31, 2018) https://www.ietf.org/mail-archieve/web/tls/current/msg25320.html.
Putman, [TLS] Preshared Keypairs for (D)TLS 1.2 (Oct. 26, 2017) https://www.ietf.org/mail-archrive/web/tls/current/msg24802.html.
Triple Diffie-Hellman (ECC compatible) Any attacks against it? (Aug. 18, 2002) https://groups.google.com/forum/print/msg/sci.crypt.
David Wong: DISCO.
Marc Fischlin, Felix Günther: Multi-Stage Key Exchange and the Case of Google's QUIC Protocol.
RFC 5246: The Transport Layer Security (TLS) Protocol Version 1.2.
RFC 7296: Internet Key Exchange Protocol Version 2 (IKEv2).
The Transport Layer Security (TLS) Protocol Version 1.3, draft-ietf-tls-tls13-23.
Andrew Chi-Chih Yao and Yunlei Zhao: Privacy-Preserving Authenticated Key-Exchange Over Internet, IEEE Transactions on Information Forensics and Security vol. 9, No. 1, Jan. 2014, p. 125.
Technical Guideline TR-03110: Advanced Security Mechanisms for Machine Readable Travel Documents and eIDAS Token.

\* cited by examiner

MODULAR KEY EXCHANGE FOR KEY AGREEMENT AND OPTIONAL AUTHENTICATION

TECHNICAL FIELD

Various exemplary embodiments disclosed herein relate generally to a modular key exchange protocol for key agreement and optional authentication.

BACKGROUND

Various key exchange protocols have been developed to facilitate a key exchange for secure commutations. For example, these protocols may use the protocol to determine and share a common symmetric cryptographic key to be used for secure communication between two parties. Further, authentication of the parties may be a part of such a protocol to prevent attackers from gaining access to the secure communications.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a method of generating a shared secret by a first party between a first party and a second party, including: checking a certificate including the second party's public key Y; randomly generating an ephemeral private key r; computing an ephemeral public key R based upon the ephemeral private key r and a generator G, where the generator G is an element of a group $\mathbb{G}$; computing a semi-static shared secret R' based upon the ephemeral private key r and the second party's public key Y; encrypting a certificate for the first party's public key X using a hash of the semi-static shared secret R' as an encryption key; transmitting to the second party the ephemeral public key R and the encrypted certificate for the first party's public key X; receiving from the second party an ephemeral public key S; checking that the ephemeral public key S is an element of the group G; computing an ephemeral shared secret Z' based upon the ephemeral private key r and the ephemeral public key S; computing a semi-static shared secret S' based upon a private key x of the first user, the ephemeral private key r, the ephemeral public key S, and the ephemeral shared secret Z'; and computing the shared secret Z as the hash of the ephemeral shared secret Z', the semi-static shared secret R', the semi-static shared secret S', the first party's public key X, and the second party's public key Y.

Various embodiments are described, wherein calculating a semi-static shared secret S' further comprises calculating: $S'=(x-r)\cdot S+Z'$.

Various embodiments are described, wherein the hash for computing the shared secret Z further includes a password w.

Various embodiments are described, wherein the second party's certificate includes a second party extended public key Y' where $Y'=y\cdot G'$, computing an ephemeral public key R further comprises calculating $R=r\cdot(G+\pi\cdot G')$, where $\pi$ is the hash of a password and the generator G' is an element of a group $\mathbb{G}$, and computing a semi-static shared secret R' further comprises calculating $R'=r\cdot(Y+\pi\cdot Y')$.

Various embodiments are described, wherein computing a semi-static shared secret S' comprises calculating $S'=(x-r+\pi)\cdot S+Z'$.

Further various embodiments relate to a method of generating a shared secret by a second party between a first party and a second party, including: randomly generating an ephemeral private key s; computing an ephemeral public key S based upon the ephemeral private key s and a generator G, where the generator G is an element of a group $\mathbb{G}$; receiving from the first party an ephemeral public key R and an encrypted certificate for the first party's public key X; transmitting to the second party the ephemeral public key S; checking that the ephemeral public key R is an element of the group $\mathbb{G}$; calculating an ephemeral shared secret Z' based upon the ephemeral private key s and the ephemeral public key R; calculating a semi-static shared secret R' based upon a private key y of the second user, the ephemeral private key s, the ephemeral public key R, and the ephemeral shared secret Z'; decrypting the encrypted certificate for the first party's public key using a hash of the semi-static shared secret R' as a decryption key; checking the certificate for the first party's public key; computing a semi-static shared secret S' based upon the ephemeral private key s and the first party's public key X; and computing the shared secret Z as the hash of the ephemeral shared secret Z', the semi-static shared secret R', the semi-static shared secret S', the first party's public key X, and the second party's public key Y.

Various embodiments are described, wherein calculating a semi-static shared secret R' further comprises calculating: $R'=(y-s)\cdot R+Z'$.

Various embodiments are described, wherein the hash for computing the shared secret Z further includes a password w.

Various embodiments are described, wherein computing an ephemeral public key S further comprises calculating $S=s\cdot(G+\pi\cdot G')$, where $\pi$ is the hash of a password and the generator G' is an element of a group $\mathbb{G}$, the first party's certificate includes a first party extended public key X' where $X'=x\cdot G'$, and computing a semi-static shared secret S' further comprises calculating $S'=s\cdot(X+\pi\cdot X')$.

Various embodiments are described, wherein computing an ephemeral public key S further comprises calculating $S=s\cdot G_\pi$, where $G_\pi=G+\pi\cdot G'$, $\pi$ is the hash of a password, and the generator G' is an element of a group $\mathbb{G}$, and computing a semi-static shared secret S' comprises calculating $S'=s\cdot\tilde{X}_\pi$, where $\tilde{X}_\pi=X+\pi\cdot X'+\pi\cdot G_\pi$ and X' is a first party extended public key where $X'=x\cdot G'$.

Various embodiments are described, wherein method of generating a shared secret by a first party between a first party and a second party, including: randomly generating an ephemeral private key r; computing an ephemeral public key R based upon the ephemeral private key r and a generator G, where the generator G is an element of a group $\mathbb{G}$; transmitting to the second party the ephemeral public key R; receiving from the second party an ephemeral public key S and an encrypted certificate including the second party's public key Y; checking that the ephemeral public key S is an element of the group $\mathbb{G}$; computing an ephemeral shared secret Z' based upon the ephemeral private key r and the ephemeral public key S; decrypting the encrypted certificate for the second party's public key; checking the certificate for the second party's public key Y; computing a semi-static shared secret R' based upon the ephemeral private key r and the second party's public key Y; encrypting a certificate including the first party's public key X using a hash of the semi-static shared secret R' as an encryption key; transmitting to the second party the encrypted certificate for the first party's public key X; computing a semi-static shared secret S' based upon a private key x of the first user, the ephemeral private key r, the ephemeral public key S, and the ephemeral shared secret Z'; and computing the shared secret Z as the hash of the ephemeral shared secret Z', the semi-static shared secret R', the semi-static shared secret S', the first party's public key X, and the second party's public key Y.

Various embodiments are described, wherein calculating a semi-static shared secret S' further comprises calculating: $S'=(x-r)\cdot S+Z'$.

Various embodiments are described, wherein the hash for computing the shared secret Z further includes a password w.

Various embodiments are described, wherein the second party's certificate for a second party extended public key Y' where $Y'=y\cdot G'$, computing an ephemeral public key R further comprises calculating $R=r\cdot(G+\pi\cdot G')$, where $\pi$ is the hash of a password and the generator G' is an element of a group $\mathbb{G}$, and computing a semi-static shared secret R' further comprises calculating $R'=r\cdot(Y+\pi\cdot Y')$.

Various embodiments are described, wherein computing a semi-static shared secret S' comprises calculating $S'=(x-r+\pi)\cdot S+Z'$.

Various embodiments are described, wherein method of generating a shared secret by a second party between a first party and a second party, including: randomly generating an ephemeral private key s; computing an ephemeral public key S based upon the ephemeral private key s and a generator G, where the generator G is an element of a group $\mathbb{G}$; receiving from the first party an ephemeral public key R; checking to verify that the ephemeral public key R is an element of the group $\mathbb{G}$; calculating an ephemeral shared secret Z' based upon the ephemeral private key s and the ephemeral public key R; encrypting a certificate for the second party's public key Y using a hash of the ephemeral shared secret Z' as an encryption key; transmitting to the second party the ephemeral public key S and the encrypted certificate for the second party's public key Y; calculating a semi-static shared secret R' based upon a private key y of the second user, the ephemeral private key s, the ephemeral public key R, and the ephemeral shared secret Z'; receiving from the first party an encrypted certificate for the first party's public key X; decrypting the encrypted certificate for the first party's public key using a hash of the semi-static shared secret R' as a decryption key;

checking the certificate for the first party's public key; computing a semi-static shared secret S' based upon the ephemeral private key s and the first party's public key X; and computing the shared secret Z as the hash of the ephemeral shared secret Z', the semi-static shared secret R', the semi-static shared secret S', the first party's public key X, and the second party's public key Y.

Various embodiments are described, wherein calculating a semi-static shared secret R' further comprises calculating: $R'=(y-s)\cdot R+Z'$.

Various embodiments are described, wherein the hash for computing the shared secret Z further includes a password w.

Various embodiments are described, wherein computing an ephemeral public key S further comprises calculating $S=s\cdot(G+\pi\cdot G')$, where $\pi$ is the hash of a password and the generator G' is an element of a group $\mathbb{G}$, the first party's certificate includes a first party extended public key X' where $X'=x\cdot G'$, and computing a semi-static shared secret S' further comprises calculating $S'=s\cdot(X+\pi\cdot X')$.

Various embodiments are described, wherein computing an ephemeral public key S further comprises calculating $S=s\cdot G_\pi$, where $G_\pi=G+\pi\cdot G'$, $\pi$ is the hash of a password, and the generator G' is an element of a group $\mathbb{G}$, and computing a semi-static shared secret S' comprises calculating $S'=s\cdot \tilde{X}_\pi$, where $\tilde{X}_\pi=X+\pi\cdot X'+\pi\cdot G_\pi$ and X' is a first party extended public key where $X'=x\cdot G'$.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Many key exchange protocols are either very complicated or not (fully) secure, and in some cases both, e.g., TLS, IKE, SKEME, simple DH, STS, . . . .

The embodiments described herein provide a simple but still secure key exchange protocol. Security of key exchange protocols has many aspects; providing and proving all these properties gets harder with more complex protocols. These security properties may include: perfect forward secrecy; forward deniability; key compromise impersonation resistance; security against unknown key share attack; explicit or implicit authentication; key confirmation; protocol is (session-)key independent; key separation (different keys for encryption and MACing); extendable, e.g. against DOS attacks . . . (e.g. using cookies, . . . ); support of early messages; small communication footprint; and support of for public-key and/or password authentication.

The embodiments of key exchange protocols described herein has a similar communication protocol as a normal Diffie-Hellman key exchange (DH-KE) in its secret sharing phase, but performs additional computations on each side. It combines an ephemeral key exchange with two semi-static key exchanges. Afterwards, these key exchange embodiments check to determine if the key exchange was correctly executed by using an explicit or implicit authentication and key confirmation. On top of this or instead. a password authentication can also be used in using two different methods. Several multiplications are needed to carry out the key exchange protocol that may be optimized by using pre-computation for the same bases. The embodiments described herein provide a technological advancement in security by improving various security properties as described above.

Various embodiments of a key exchange protocol will now be described. In various situations two parties Alice (A) and Bob (B) want to communicate with each other using a communication link such as the internet. Alice and Bob want the communications to be confidential and to verify the authenticity of the communications from the other party. Authenticity means that one party is sure that it really communicates with the other party, that the messages are really coming from this other party, and that the messages have not been changed during transit (this last property is also called integrity). Confidentiality means that nobody else knows the content of the messages sent between the parties. There are even more properties that may be desired, but these two are the main properties usually desired.

To establish such a secure communication channel there are different possibilities, depending on the infrastructure that is available to Alice and Bob. In most cases this will be a public key infrastructure (PKI) or they already share a secret key, e.g., kAB. In the first case (PKI) one or both parties have a private/public key pair and in many cases also some certificate (Cert) of their public key, signed by a trusted third party (TTP), such that everybody who also trusts the TTP is assured that a certified public key belongs to the corresponding party, which is also included in the certificate. For Alice, the private key is x, and the public key is X. For Bob, the private key is y, and the public key is Y. For public key algorithms, the fundamental building blocks are usually based on one or more mathematical groups $\mathbb{G}$, such as $\mathbb{Z}_p$ the ring of integers modulo a prime p (or a multiplicative subgroup of it) or a prime order subgroup of an elliptic curve $E(\mathbb{F}_q)$ over some field $\mathbb{F}_q$ with q either prime or a power of two. There are also other groups possible, but these are the most common ones used. Such groups usually have a generator G, such that all group elements can be uniquely represented as i·G with some integer i smaller than the group order n=|$\mathbb{G}$|=|⟨G⟩| (size of the group).

Other building blocks may include symmetric encryptions $ENC_k$ with some key k, e.g., AES, together with the corresponding symmetric decryption $DEC_k$, message authentication codes $MAC_k$ with a key k, e.g., CMAC, and hash functions h, e.g., SHA-256. Sometimes encryption and authentication is combined into one single building block and is called authenticated encryption. For example, the following is an example of authenticated encryption: $EM_K(m)=ENC_k(m)\|MAC_{k'}(ENC_k(m))$, where K=k∥k' and "∥" means the concatenation of two bit-strings. This construction is called Encrypt-then-MAC (EtM).

To establish a secure channel normally a key exchange protocol is executed, such that after its execution the two parties agree on and share a common secret, which they use further to derive encryption and authentication keys to be used for ENC/DEC and MAC functions. In more advanced key exchange protocols, the parties may also have assurance of the other party's identity as well as the assurance that an attacker cannot prove that the two parties have communicated with each other; even one party cannot prove later that the other party was part of the communication (forward deniability). A further major property of such advanced key exchange protocols is the fact that if a long-term secret key is compromised, the security of previous established secure channels is still sound if the ephemeral keys are not compromised. This is called perfect forward secrecy. Various embodiments described below include the combination of a variety of steps that provide the properties that illustrated a technological advancement.

A very simple example of a key exchange protocol is the Diffie-Hellman key exchange (DH-KE), which is shown in Table 1 and is used in many protocols as a building block. But because there is no authentication included, DH-KE is vulnerable to so called man-in-the-middle attacks.

TABLE 1

| DH Key Exchange | | |
|---|---|---|
| Alice knows: $\mathbb{G}$, G, n | Communication | Bob knows: $\mathbb{G}$, G, n |
| $r \in_R \mathbb{Z}_n$ | | |
| R = r · G | | |
| | R → | |
| | | $s \in_R \mathbb{Z}_n$ |
| | | S = s · G |
| | ← S | |
| Z = r · S | | Z = s · R |

Here $e \in_R M$ means taking a random element e from the set M according to a uniform distribution, such that each execution of the protocol uses different e's with very high probability. These various building blocks may be combined together into a key exchange protocol, such that the communication in the first phase may still be the same as (or very similar) as for the simple DH-KE, but provides more security and the possibility to add more features as well as drop some features (like authentication if not desired in some cases, like client server communication) in a very modular way. This approach means that the basis of the key exchange protocol is always the same, but some modules can be used or switched off as required by the actual use case. This key exchange protocol is split into three parts: 1) Secret Sharing; 2) Key Derivation and Refresh; and 3) Authentication.

The secret sharing part is the most complex of the three parts and is explained for one use case in Table 2.

TABLE 2

| Secret Sharing | | |
|---|---|---|
| Alice: $\mathbb{G}$, G, n, x, X = x · G | Communication | Bob: $\mathbb{G}$, G, n, y, Y = y · G |
| Get and check Cert(Y) $r \in_R \mathbb{Z}_n$ R = r · G R' = r · Y | | $s \in_R \mathbb{Z}_n$ S = s · G |
| | R, $EM_{h(R')}$(Cert(X), . . .) → ← S | |
| Check S ∈ $\mathbb{G}$ Z' = r · S S' = (x − r) · S + Z'; (=x · S) Z = h(Z', R', S', X, Y) | | Check R ∈ $\mathbb{G}$ Z' = s · R R' = (y − s) · R + Z'; (=y · R) Decrypt & check Cert(X) S' = s · X Z = h(Z', R', S', X, Y) |

Table 2 shows the information that Alice and Bob have at the start, the calculations that each party performs, and the communication between them. The handling of the certificates needs some special treatment, because it depends on the availability of the certificates and the need for authenticity. Cert(Y) might already be known by Alice (either hard-coded or already available in a cache) or could be obtained from the TTP (over another secure channel) as well as directly from Bob, if Bob's identity is not sensitive. If Alice does not need to authenticate herself, then set x=1 and hence X=G, such that the same protocol can be used even for one sided authentication. This would of course also work for Bob with y=1 and Y=G. Possible methods of handling certificates are described below. Note that $EM_h(R')(\ldots)$ is a very simple form of elliptic curve integrated encryption scheme (ECIES) and that Alice could send some first message with this, but she has to take into account that she does not have assurance about Bob's identity as well as that there is no forward secrecy included in this encryption. At least she can be sure that only Bob can read the content if Bob's secret key y is not compromised. Furthermore, the computation of S' and R' already include some protection against side channel analysis by only using the secret keys x and y in an addition, which usually is considered one of the operations that do not leak very much information and could also be easily protected further. This countermeasure does randomize the scalar and hence should increase protection against DPA like attacks.

It is noted that during denial of service (DoS) attacks, the computation of S may be done before any communication from Alice arrives and may even be sped up by pre-computation or batch-computation. So, if Bob is under heavy load, Bob may delay any further messages and computations until he has received the next message from Alice. If even this overloads Bob's resources, he may fall back to the simple use of cookies.

After having computed the shared secret Z on both sides, Alice and Bob derive some keys from the shared secret Z in a way that provides forward secrecy, (session-)key independence, and key separation. To achieve this, the key exchange protocol will derive two keys and a new shared secret such that nobody can compute the original shared secret from the two derived keys and the new shared secret, and the keys and new secret are computationally independent. Because a new shared secret is also computed, a key refresh may be initialized at any time without much extra computational effort. To stay in sync with each other Alice and Bob may also store a counter, which they increase by one for each key refresh and send it along, such that they always agree on the maximum of both counters if they ever get out of sync. To avoid DoS attacks, Alice and Bob could also agree that a refresh can only be initiated over the secure channel and/or that they abort if the two counters are too far apart. The details of a key refresh (without counters) are given in Table 3.

TABLE 3

Key Derivation and Refresh

| Alice: Z | Communication | Bob: Z |
|---|---|---|
| | ←refresh→ | |
| k‖k' = h(0x02‖Z) | | k‖k' = h(0x02‖Z) |
| Z = h(0x01‖Z) | | Z = h(0x01‖Z) |

The assumption in the key derivation is that the hash function generates as many bits as the encryption function and the MAC function will need for their keys k and k' together. This assumption is normally given, e.g., with the combination of AES-128 and SHA-256. The security level of hash functions in general is considered to be half of the hash functions output length (in bits) and the security level of an encryption scheme is normally equal to its key length (in bits). Of course, for special cases where this assumption does not hold, an extended key derivation may be used, e.g., k‖k'=h(0x02‖Z)‖h(0x03‖Z)‖ . . . . This key derivation will be done at least once after the secret sharing, whereas the computation of a new Z can be skipped if no key refresh is required. Also, if more session keys need to be derived (e.g., when using different keys for each direction) the extended key derivation may be used.

To achieve authenticity and avoid unknown key share attacks both parties must get assurance that the other party also has computed the same (fresh) Z and knows it. This can either be done implicitly by the first two authenticated messages, which must be different in this case to avoid reflection attacks, or it could be done explicitly by sending two special messages over the secure channel, which is shown in Table 4.

TABLE 4

Explicit Authentication

| Alice: K', X, Y, R, S | Communication | Bob: K', X, Y, R, S |
|---|---|---|
| | | cB = $MAC_{k'}$ (0x02, Y, X, S, R) |
| | ←cB | |
| Check cB | | |
| cA = $MAC_{k'}$(0x01, X, Y, R, S) | | |
| | cA → | |
| | | Check cA |

The check value of Bob (cB) may have been sent along with S in his first answer (see Table 2), such that Alice receives assurance about Bob's authenticity after his first answer and before her second message. In a client server setup, cA could also be replaced by the first authenticated message, if it is different from the content of cB. Note that Bob sends his first message along with cB if he does not require Alice to be authenticated.

Now another embodiment of the key exchange protocol will be described, where no certificates are needed beforehand, but an extra communication step is needed. This will also protect Bob's identity at least against passive attackers. This embodiment is shown in Table 5.

TABLE 5

Second Secret Sharing Embodiment

| Alice: 𝔾, G, n, x, X = x · G | Communication | Bob: 𝔾, G, n, y, Y = y · G |
|---|---|---|
| $r \in_R \mathbf{Z}_n$ R = r · G | | $s \in_R \mathbf{Z}_n$ S = s · G |
| | R → | |
| | | Check R ∈ 𝔾 Z' = s · R |
| | ←S, $EM_{h(Z')}$(Cert(Y), . . .) | |
| Check S ∈ 𝔾 Z' = r · S Decrypt and check Cert(Y) R' = r · Y | | R' = (y − s) · R + Z'; (=y · R) |
| | $EM_{h(R')}$(Cert(X), . . .) → | |
| S' = (x − r) · S + Z'; (=x · S) Z = h(Z', R', S', X, Y) | | Decrypt & check Cert(X) S' = s · X Z = h(Z', R', S', X, Y) |

If only one-sided authentication by Bob is needed then again set x=1 and X=G, which would also imply that the last communication step may be skipped resulting in a two-step protocol. The only drawback to the first version of the protocol is now, that Alice cannot send confidential early messages in her first communication step, because she does not know anything from Bob yet.

Also, explicit authentication by Bob can only take place in a fourth communication after he knows Alice's public key X. In case of one-sided authentication and X=G, Bob can again send cB with his first answer since he already knows X=G. More details on possible options and their impact are discussed below.

A related embodiment is when no PKI and no arithmetic primitives are available, but only a pre-shared key K and symmetric crypto primitives are available. If Alice and Bob still want to agree on a fresh random shared secret Z, this may be achieved by the protocol shown in Table 6.

TABLE 6

Secret Sharing variant 3

| Alice: K | Communication | Bob: K |
|---|---|---|
| $R \in_R [0, 2^{len(K)} - 1]$ | | |
| | $R \rightarrow$ | |
| | | $S \in_R [0, 2^{len(K)} - 1]$ |
| | $\leftarrow S$ | |
| $R' = MAC_K(R)$ | | $R' = MAC_K(R)$ |
| $S' = MAC_K(S)$ | | $S' = MAC_K(S)$ |
| $Z = h(R', S')$ | | $Z = h(R', S')$ |

Key derivation and key refresh may be performed as described in Table 3. Also, authentication may be performed as described in Table 4, but with the minor change that X and Y are not part of the messages that are MAC'ed. This embodiment does not provide forward secrecy anymore. Also, this embodiment only works if Alice and Bob already have set up a pre-shared key K, but as a result, they do not need any certificates anymore because some sort of trust is already present.

Now that various embodiments have been described, different options for certificate handling may be examined as well as explicit and implicit authentication and their impact. For this only the communication steps will be discussed, because the computations are always the same, just in slightly different order in some cases and some variables set to 1 or G. The different options that are available are:
1. Authentication:
  a. Mutual
  b. One-sided by Bob (e.g., client server): x=1, X=G, S'=S, no Cert(X), no cA
  c. One-sided by Alice: y=1, Y=G, R'=R, no Cert(Y), no cB
  d. None (simple DH): x=y=1, X=Y=G, R'=R, S'=S, no Certs, no cA, no cB
2. Explicit Authentication (if applicable):
  a. By both
  b. Only by Bob: replace cA by first message from Alice, different from cB
  c. Only by Alice: replace cB by first message from Bob, different from cA
  d. Only implicit: replace cA and cB by first messages, which must be different
3. Certificate provisioning (for each party):
  a. Already known
  b. From TTP (over secure channel)
  c. From other party (in plain)
  d. From other Party (encrypted)

Two embodiments of certificate handling given above will be examined.

The first embodiment covers the cases: 1.a, 1.b; Cert(X): 3.a, 3.b, 3.d; Cert(Y): 3.a, 3.b, 3.c and is shown in Table 7. Table 7 shows the communications and direction in a first column then the associated authentication and secrecy are shown in columns 2 and 3. In these cases, only authenticated Bob learns Alice's identity, but Bob's identity might be known to passive attackers in case of 3.c for Cert(Y).

TABLE 7

First Embodiment of Certificate Handling

| Communication | Authentication | Secrecy |
|---|---|---|
| R, $EM_{h(R')}$(Cert(X), . . .) $\rightarrow$ | None | Early message for Bob, without FS |
| $\leftarrow$S, cB, $EM_{k,k'}$(. . .) | Bob only | Forward secrecy |
| cA, $EM_{k,k'}$(. . .) $\rightarrow$ | Both | Forward secrecy |

The second embodiment of certificate handling covers the cases: 1.a, 1.b; Cert(X): 3.a, 3.d; Cert(Y): 3.a, 3.d as shown in Table 8. In this embodiment, only authenticated Bob learns Alice's identity, but Bob's identity is only protected against passive attackers.

TABLE 8

Second Embodiment of Certificate Handling

| Communication | Authentication | Secrecy |
|---|---|---|
| R $\rightarrow$ | None | None |
| $\leftarrow$S, $EM_{h(Z)}$(Cert(Y), . . .) | None | Forward secrecy (simple anonymous DH) |
| $EM_{h(R')}$(Cert(X)), cA, $EM_{k,k'}$(. . .) $\rightarrow$ | Alice only | Early message for Bob without FS, Forward secrecy for rest |
| $\leftarrow$cB, $EM_{k,k'}$(. . .) | Both | Forward secrecy |

A generic framework will now be described to build up other versions of the protocol based on some dependencies and show the effects of each building block. Table 8 shows a list of the communication steps, their dependencies, and their effects/properties.

TABLE 9

List of communication steps, their dependencies, and their effects/properties

| No. | Communication | Dependencies | Properties/Effects |
|---|---|---|---|
| 1 | R $\rightarrow$ | None | |
| 2 | $\leftarrow$S | None | |
| 3 | $\leftarrow EM_{h(Z)}$(Cert(Y), emBA) | R, S | secure against passive attackers (DH), FS, supports early message emBA from Bob to Alice |
| 3b | $EM_{h(Z)}$(Cert(X), emAB) $\rightarrow$ | R, S | secure against passive attackers (DH), FS, supports early message emAB from Alice to Bob |

TABLE 9-continued

List of communication steps, their dependencies, and their effects/properties

| No. | Communication | Dependencies | Properties/Effects |
|-----|---------------|--------------|---------------------|
| 4 | $EM_{h(R')}(Cert(X), emAB) \rightarrow$ | R, Y | (EC)IES like, secure against active attackers given Cert(Y), one sided FS (x compromised), supports early message from Alice to Bob |
| 4b | $\leftarrow EM_{h(S')}(Cert(Y), emBA)$ | S, X | (EC)IES like, secure against active attackers given Cert(X), one sided FS (y compromised), supports early message from Bob to Alice |
| 5 | $cA \rightarrow$ | R, S, X, Y | authenticates Alice given Cert(X) |
| 6 | $\leftarrow cB$ | R, S, X, Y | authenticates Bob given Cert(Y) |
| 7 | $EM_{k,k'}(fmAB) \rightarrow$ | R, S, X, Y | first message, FS, authenticates Bob, given Cert(Y) and fmAB ≠ fmBA |
| 8 | $\leftarrow EM_{k,k'}(fmBA)$ | R, S, X, Y | first message, FS, authenticates Alice, given Cert(X) and fmBA ≠ fmAB |

The dependencies are straightforward so that many things could even be done in parallel, especially if the public keys are already known and trusted. In this special case and if simultaneous messages are possible, the key exchange protocol may even be done in one or two steps, depending how the steps are counted: the first step would exchange R and S, and in the next step the first messages could be exchanged providing implicit authentication. But some care must be taken if only Alice should authenticate, because then Y=G and Cert(Y) is not available. Hence also number 4 in Table 9 is not possible, at least the encryption does not provide any security, but functionally it would still work.

For security, several other aspects might be of interest:
The length of an encrypted certificate might still leak, such that privacy might not be as strong as expected. There are several options to mitigate this:
  Only use public keys instead of complete certificates in the key exchange protocol and get certificates from TTP over another secure channel, which might not be attacked or where the certificate can be hidden in other traffic.
  Add a nonce to certificates to generate different lengths. Maybe also restrict to a limited set of lengths to limit the number of different classes.
  If the PKI allows, restrict certificates and certificate chains to a fixed length.
  Also, a mix might be an option, where only the first link of a certificate chain is used directly in the key exchange (either with fixed length or extended with nonce) and the rest of the certificate chain is loaded from a TTP over another secure channel, which might not be attacked or where the certificate (chain) may be hidden in other traffic.
Protection against DoS attacks could be added for example by use of cookies, but which would add some extra communication. Also, other mechanisms may be easily added depending on the needs.
Error handling cannot be postponed after key agreement, because otherwise small subgroup attacks might be possible or privacy might be weakened if Cert(X) is sent encrypted to a malicious Bob.

For efficient implementations, the multiplications may be optimized for example by using pre-computation for the comb-method (for the same bases). In one example, this could mean if a multiplication for the group check needs to be done (which is not always necessary), then three powers of 2 times G may be pre-computed, which would give 4 combs and 16 combinations. This would speed up the following multiplications by 4, so instead of 5 multiplications, for Alice one by G, one by Y and three by S, it would only be ¼ by G, ¼ by Y plus an online pre-computation and ¾ by S plus an online pre-computation. This would correspond roughly to 2 simple regular multiplications as for example with a Montgomery Ladder.

In various applications, for example internet of things (IoT) applications, there might also be the requirement that an additional password w should be added to the authentication, e.g., for smart home applications, where one manufacturer wants to connect only with devices made by the manufacturer, but on the other hand the user also wants to protect against access by other users. There are two ways to achieve this, which is shown by modifications to Table 2. The communication steps are still the same (except for slightly larger certificates in one case), and hence all other things described above with respect to Table 2 also hold (with slight adaptations). The first embodiment of a method to add passwords is shown in Table 10.

TABLE 10

Adding passwords efficiently

| Alice: $\mathbb{G}$, G, n, x, X = x · G, w | Communication | Bob: $\mathbb{G}$, G, n, y, Y = y · G, w |
|---|---|---|
| Get and check Cert(Y) $r \in_R \mathbb{Z}_n$ R = r · G R' = r · Y | | $s \in_R \mathbb{Z}_n$ S = s · G |
| | R, $EM_{h(R')}(Cert(X), \ldots)$ $\rightarrow$ $\leftarrow S$ | |
| Check S ∈ $\mathbb{G}$ Z' = r · S S' = (x − r) · S + Z'; (=x · S) Z = h(Z', R', S', X, Y, w) | | Check R ∈ $\mathbb{G}$ Z' = s · R R' = (y − s) · R + Z'; (=y · R) Decrypt & check Cert(X) S' = s · X Z = h(Z', R', S', X, Y, w) |

This embodiment of Table 10 may be used if strong passwords are used and/or offline brute-force attacks are acceptable. This is very efficient, but also has some effect on security: the privacy is slightly different, now only Alice and Bob (or somebody who knows w) can simulate such a protocol, whereas before everybody could do so, especially neither Alice nor Bob can prove that the other one has taken part in the communication. If weak passwords are used than an active attacker could replace the party who receives the first authenticated message (either explicitly or implicitly) and then do an offline brute-force attack to get the password w. This might for example be a possible attack if Bob is an access point like device and Alice is a client without secret key, which can then easily be replaced by an attacker, who then only needs one protocol execution to be able to do an off-line brute-force attack afterwards. Please note that if there is more than one password possible and Alice does not use a certificate, it might be that Alice has to send at least some identification data in this early message (instead of her certificate) if Bob does not have any other way to select the right password.

A second embodiment for adding passwords needs some more setup. In addition to the generator G, a second generator G' is also needed, which has an unknown discrete logarithm to base G. One possible method to get this is simply by choosing G and G' by a pseudorandom function with a public seed, which could, for example, be for an elliptic curve. Then, the first point on the curve with x-coordinate equal to the output of the pseudorandom function and smallest y-coordinate (or also randomized by the pseudorandom function) for this x-coordinate is selected, and this process is iterated until a valid point is found. Depending on the co-factor, one may also have to multiply the result by the co-factor to get into the right subgroup. The second point is then chosen in the same way with the following output of the pseudorandom function. For subgroups of $\mathbb{Z}_p$, the numbers would be a longer output of the pseudorandom function, reduced modulo p and multiplied by the co-factor if given. In this embodiment, the public keys also must be extended by another component, namely $X'=x \cdot G'$ and $Y'=y \cdot G'$. The password w should then be hashed $\pi=h(w)$ (or a shared key might be used), and the hash may also be truncated (if security bounds allow it, performance is critical, and no pre-computation can be stored/cached). Also, some additional information may be added to the input to the hash function. With this preparation, a more secure protocol variant with password may be built, which is shown in Table 11.

TABLE 11

Adding Passwords more securely

| Alice: $\mathbb{G}$, G', n, x, | | Bob: $\mathbb{G}$, G, G', n, y, |
|---|---|---|
| $X = x \cdot G$, | | $Y = y \cdot G$, |
| $X' = x \cdot G'$, $\pi = h(w)$ | Communication | $Y' = y \cdot G'$, $\pi = h(w)$ |
| Get and check Cert(Y, Y') | | $s \in_R \mathbb{Z}_n$ |
| $r \in_R \mathbb{Z}_n$ | | $S = s \cdot (G + \pi \cdot G')$ |
| $R = r \cdot (G + \pi \cdot G')$ | | |
| $R' = r \cdot (Y + \pi \cdot Y')$ | | |
| | R, | |
| | $EM_{h(R')}(Cert(X, X'), \ldots)$ | |
| | $\rightarrow$ | |
| | $\leftarrow S$ | |
| Check $S \in \mathbb{G}$ | | Check $R \in \mathbb{G}$ |
| $Z' = r \cdot S$ | | $Z' = s \cdot R$ |
| $S' = (x - r) \cdot S + Z'$; | | $R' = (y - s) \cdot R + Z'$; |
| $(=x \cdot S)$ | | $(=y \cdot R)$ |
| $Z = h(Z', R', S', X, T)$ | | Decrypt & check |
| | | Cert(X, X') |
| | | $S' = s \cdot (X + \pi \cdot X')$ |
| | | $Z = h(Z', R', S', X, Y)$ |

If $\pi$ is short (e.g., only 64 bits), it may be acceptable to compute R, R', S and S' as given in Table 11, but for a longer $\pi$, it might be faster to use Shamir's trick and compute the sum of two multiplications directly. Here also some pre-computation may be done for G'. If the number of parties/passwords is not too large, even $G+\pi \cdot G'$, $Y+\pi \cdot Y'$, $X+\pi \cdot X'$ may be pre-computed and stored instead of $\pi$ or w. If the password is not used/needed for any other purpose, the password can then even be deleted. In a client/server use case with one-sided authentication, this would mean that the server only stores $G_\pi:=G+\pi \cdot G'$. So even if the Server (Bob) is compromised, a brute force attack is necessary to obtain $\pi$. But note that $Y+\pi \cdot Y'$ could still be computed by multiplication with y, which is needed for authentication. To even protect against this, the protocol may be modified a little, which is shown below in Table 12. The embodiment of Table 11 is not so efficient as the embodiment in Table 7 (if the above-mentioned values are not pre-computed and stored), but the embodiment of Table 11 is more secure: The privacy is similar, as only Alice and Bob (or somebody who knows w, $\pi$ or $G_\pi$) can simulate such a protocol, but still nobody can prove that somebody else has participated in the communication. If weak passwords are used, then an active attacker could replace the party who receives the first authenticated message (either explicit or implicit), but then the attacker cannot do an offline brute-force attack to get the password w, because for each password the attacker must compute Z' with another r (or s, depending on the side), which the attacker cannot compute, because the discrete logarithm of G' to base G is hard to solve. So, the attacker can do only online attacks with one password guess per protocol run. This might for example be a possible attack if Bob is an access point like device and Alice is a client without secret key, which may then easily be replaced by an attacker, but then needs several protocol executions to brute-force the password. So, if $\pi$ has for example 64 bits, then the expected number of guesses until the attacker finds the right password is $2^{63}$, which might be sufficient in certain cases, especially if the protocol execution does take a while or if repetitions after a fail are delayed. But of course, a longer $\pi$ could also be used to support higher security with more secure passwords; a 128-bit $\pi$ should be a match for AES-128 and 256-bit ECC.

This embodiment actually also allows the use of a password only authentication without the need for a PKI, similar as for password authenticated connection establishment (PACE) protocol, but more efficient (using the generic mapping and even more efficient than the integrated mapping if the pre-computation per party and password would be stored).

Note that if there is more than one password and Alice does not send a certificate in her early message, she might have to send some other identification data in this early message. Bob cannot compute a proper S before he knows which password to take (which he also might know by some other means), but he could already select s and compute $Z'=s \cdot R$ and $R'=(y-s) \cdot R+Z'$ to decrypt Alice's early message. Afterwards Bob can then compute $S=s \cdot G_\pi$ and send it back to Alice.

In case of a client/server setup, one might wish to protect the password derived information on the server (Bob) in a way that if the information on the server is lost to an attacker, the attacker cannot immediately use it to authenticate on other servers with the same password. This can be achieved by adding $\pi$ to Alice's private key (which might be 1 in case of one-sided authentication) and is shown in Table 12.

TABLE 12

Adding Passwords even more securely

| Alice: $\mathbb{G}, G, G', n, x,$ | | Bob: $\mathbb{G}, G, G', n, y, Y = y \cdot G,$ |
|---|---|---|
| $X = x \cdot G,$ | | $Y' = y \cdot G', G_\pi = G + \pi \cdot G',$ |
| $X' = x \cdot G', \pi = h(w)$ | Communication | $\tilde{X}_\pi = X + \pi \cdot X' + \pi \cdot G_\pi$ |
| Get and check Cert | | $s \in_R \mathbb{Z}_n$ |
| $(Y, Y')$ | | $S = s \cdot G_\pi$ |
| $r \in_R \mathbb{Z}_n$ | | |
| $R = r \cdot (G + \pi \cdot G')$ | | |
| $R' = r \cdot (Y + \pi \cdot Y')$ | | |
| | $R, EM_{h(R')}(\ldots) \rightarrow$ | |
| | $\leftarrow S$ | |
| Check $S \in \mathbb{G}$ | | Check $R \in \mathbb{G}$ |
| $Z' = r \cdot S$ | | $Z' = s \cdot R$ |
| $S' = (x - r + \pi) \cdot S + Z'$ | | $R' = (y - s) \cdot R + Z';\ (=y \cdot R)$ |
| $(=(x + \pi) \cdot S)$ | | $S' = s \cdot \tilde{X}_\pi$ |
| $Z = h(Z', R', S', X, Y)$ | | $Z = h(Z', R', S', X, Y)$ |

The setup of $G_\pi$ and $\tilde{X}_\pi$ at Bob's side must be done before this protocol can be executed. Bob either computes these values on his own by getting $\pi$ from Alice, or Bob directly gets these values from Alice. The latter option is selected if Bob should not learn Alice's password, whereas in the first option Bob could also check Alice's certificate and link it to the password (if available). In more sophisticated setups even Zero-Knowledge proofs could be used by Alice to demonstrate to Bob that she knows $\pi$ and that the same $\pi$ was used to compute $G_\pi$ and $\tilde{X}_\pi$, without providing $\pi$ itself. This protocol embodiment is a further generalization of the embodiments without a password, because if $\pi=0$, it will be the same. This embodiment leads to easy and flexible implementations.

The embodiments described herein provide many benefits and technological advancements including: needing less communication steps in many cases; supporting one-sided authentication as well as two-sided authentication; supporting early messages; supporting optional/additional authentication by password; supporting different options for certificate handling; providing forward deniability; supporting implicit authentication with less communication overhead; providing implicit DPA resistance; having a simple key derivation; providing strong password-based authenticated key exchange; supports key refreshment without new DH-KE, but still providing forward secrecy; optionally supporting one-sided or two-sided public-key authentication; and providing side channel resistance.

The embodiments described herein combine several options (for authentication and certificate handling) in such a modular way, that even authentication by public-key and password can be done at the same time. All variants have the same (or at least similar) small communication footprint (in principal only a normal DH-KeyExchange plus plain or encrypted certificates when needed), but provide a large set of security properties.

Figure 1:
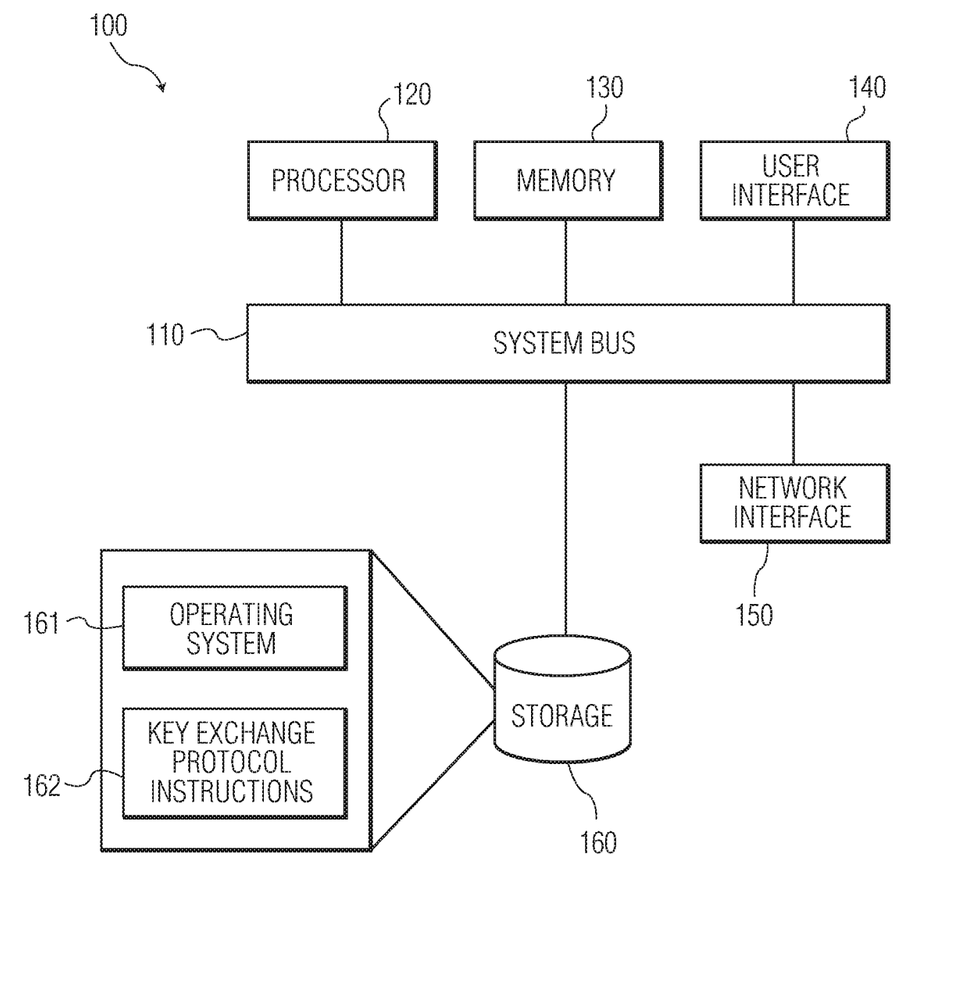
FIG. 1 illustrates an exemplary hardware diagram 100 for implementing a key exchange protocol according to the embodiments described above.

FIG. 1 illustrates an exemplary hardware diagram 100 for implementing a key exchange protocol according to the embodiments described above. As shown, the device 100 includes a processor 120, memory 130, user interface 140, network interface 150, and storage 160 interconnected via one or more system buses 110. It will be understood that FIG. 1 constitutes, in some respects, an abstraction and that the actual organization of the components of the device 100 may be more complex than illustrated.

The processor 120 may be any hardware device capable of executing instructions stored in memory 130 or storage 160 or otherwise processing data. As such, the processor may include a microprocessor, field programmable gate array (FPGA), application-specific integrated circuit (ASIC), or other similar devices.

The memory 130 may include various memories such as, for example L1, L2, or L3 cache or system memory. As such, the memory 130 may include static random access memory (SRAM), dynamic RAM (DRAM), flash memory, read only memory (ROM), or other similar memory devices.

The user interface 140 may include one or more devices for enabling communication with a user such as an administrator. For example, the user interface 140 may include a display, a mouse, and a keyboard for receiving user commands. In some embodiments, the user interface 140 may include a command line interface or graphical user interface that may be presented to a remote terminal via the network interface 150. In some embodiments, no user interface may be present.

The network interface 150 may include one or more devices for enabling communication with other hardware devices. For example, the network interface 150 may include a network interface card (NIC) configured to communicate according to the Ethernet protocol. Additionally, the network interface 150 may implement a TCP/IP stack for communication according to the TCP/IP protocols. Various alternative or additional hardware or configurations for the network interface 150 will be apparent.

The storage 160 may include one or more machine-readable storage media such as read-only memory (ROM), random-access memory (RAM), magnetic disk storage media, optical storage media, flash-memory devices, or similar storage media. In various embodiments, the storage 160 may store instructions for execution by the processor 120 or data upon with the processor 120 may operate. For example, the storage 160 may store a base operating system 161 for controlling various basic operations of the hardware 100. Further, software for the handshake protocol function 162, may be stored in the memory. This software may implement the various embodiments described above.

It will be apparent that various information described as stored in the storage 160 may be additionally or alternatively stored in the memory 130. In this respect, the memory 130 may also be considered to constitute a "storage device" and the storage 160 may be considered a "memory." Various other arrangements will be apparent. Further, the memory 130 and storage 160 may both be considered to be "non-transitory machine-readable media." As used herein, the term "non-transitory" will be understood to exclude transitory signals but to include all forms of storage, including both volatile and non-volatile memories.

While the host device 100 is shown as including one of each described component, the various components may be duplicated in various embodiments. For example, the processor 120 may include multiple microprocessors that are configured to independently execute the methods described herein or are configured to perform steps or subroutines of the methods described herein such that the multiple processors cooperate to achieve the functionality described herein. Further, where the device 100 is implemented in a cloud computing system, the various hardware components may belong to separate physical systems. For example, the processor 120 may include a first processor in a first server and a second processor in a second server.

The embodiments described in FIG. 1 may also be implemented completely in hardware, completely in software such as described in FIG. 1, or a combination of both hardware and software.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method of generating a shared secret by a first device, wherein the shared secret is shared between the first device and a second device, comprising:
    checking a certificate including the second device's public key Y;
    randomly generating an ephemeral private key r;
    computing an ephemeral public key R based upon the ephemeral private key r and a generator G, where the generator G is an element of a group $\mathbb{G}$;
    computing a semi-static shared secret R' based upon the ephemeral private key r and the device's public key Y;
    encrypting a certificate for the first device's public key X using a hash of the semi-static shared secret R' as an encryption key;
    transmitting to the second device the ephemeral public key R and the encrypted certificate for the first device's public key X;
    receiving from the second device an ephemeral public key S;
    checking that the ephemeral public key S is an element of the group $\mathbb{G}$;
    computing an ephemeral shared secret Z' based upon the ephemeral private key r and the ephemeral public key S;
    computing a semi-static shared secret S' based upon a private key x of the first device, the ephemeral private key r, the ephemeral public key S, and the ephemeral shared secret Z'; and
    computing the shared secret Z as the hash of the ephemeral shared secret Z', the semi-static shared secret R', the semi-static shared secret S', the first device's public key X, and the second device's public key Y.

2. The method of claim 1, wherein calculating a semi-static shared secret S' further comprises calculating: $S'=(x-r) \cdot S+Z'$.

3. The method of claim 1, wherein the hash for computing the shared secret Z further includes a password w.

4. The method of claim 1, wherein
    the second device's certificate includes a second device extended public key Y' where $Y'=y \cdot G'$,
    computing an ephemeral public key R further comprises calculating $R=r \cdot (G+\pi \cdot G')$, where $\pi$ is the hash of a password and the generator G' is an element of a group $\mathbb{G}$, and
    computing a semi-static shared secret R' further comprises calculating $R'=r \cdot (Y+\pi \cdot Y')$.

5. The method of claim 4, wherein computing a semi-static shared secret S' comprises calculating $S'=(x-r+\pi) \cdot S+Z'$.

6. A method of generating a shared secret by a second device, wherein the shared secret is shared between a first device and the second device, comprising:
    randomly generating an ephemeral private key S;
    computing an ephemeral public key S based upon the ephemeral private key S and a generator G, where the generator G is an element of a group G;
    receiving from the first device an ephemeral public key R and an encrypted certificate for the first device's public key X;
    transmitting to the second device the ephemeral public key S;
    checking that the ephemeral public key R is an element of the group G;
    calculating an ephemeral shared secret Z' based upon the ephemeral private key S and the ephemeral public key R;
    calculating a semi-static shared secret R' based upon a private key Y of the second user, the ephemeral private key S, the ephemeral public key R, and the ephemeral shared secret Z';
    decrypting the encrypted certificate for the first device's public key using a hash of the semi-static shared secret R' as a decryption key;
    checking the certificate for the first device's public key;
    computing a semi-static shared secret S' based upon the ephemeral private key S and the first device's public key X; and
    computing the shared secret Z as the hash of the ephemeral shared secret Z', the semi-static shared secret R', the semi-static shared secret S', the first device's public key X, and the second device's public key Y.

7. The method of claim 6, wherein calculating a semi-static shared secret R' further comprises calculating: $R'=(y-s) \cdot R+Z'$.

8. The method of claim 6, wherein the hash for computing the shared secret Z further includes a password w.

9. The method of claim 6, wherein
    computing an ephemeral public key S further comprises calculating $S=s \cdot (G+\pi \cdot G')$, where $\pi$ is the hash of a password and the generator G' is an element of a group $\mathbb{G}$,
    the first device's certificate includes a first device extended public key X' where $X'=x \cdot G'$, and
    computing a semi-static shared secret S' further comprises calculating $S'=s \cdot (X+\pi \cdot X')$.

10. The method of claim 6, wherein
    computing an ephemeral public key S further comprises calculating $S=s \cdot G_{90}$, where $G_\pi=G+\pi \cdot G'$, $\pi$ is the hash of a password, and the generator G' is an element of a group $\mathbb{G}$, and
    computing a semi-static shared secret S' comprises calculating $S'=s \cdot \tilde{X}_\pi$, where $\tilde{X}_\pi = X + \pi \cdot X' + \pi \cdot G_\pi$ and X' is a first device extended public key where $X'=x \cdot G'$.

11. A method of generating a shared secret by a first device, wherein the shared secret is shared between the first device and a second device comprising:
    randomly generating an ephemeral private key r;
    computing an ephemeral public key R based upon the ephemeral private key r and a generator G, where the generator G is an element of a group $\mathbb{G}$;

transmitting to the second device the ephemeral public key R;
receiving from the second device an ephemeral public key S and an encrypted certificate including the second device's public key Y;
checking that the ephemeral public key S is an element of the group $\mathbb{G}$;
computing an ephemeral shared secret Z' based upon the ephemeral private key r and the ephemeral public key S;
decrypting the encrypted certificate for the second device's public key;
checking the certificate for the second device's public key Y;
computing a semi-static shared secret R' based upon the ephemeral private key r and the second device's public key Y;
encrypting a certificate including the first device's public key X using a hash of the semi-static shared secret R' as an encryption key;
transmitting to the second device the encrypted certificate for the first device's public key X;
computing a semi-static shared secret S' based upon a private key x of the first user, the ephemeral private key r, the ephemeral public key S, and the ephemeral shared secret Z'; and
computing the shared secret Z as the hash of the ephemeral shared secret Z', the semi-static shared secret R', the semi-static shared secret S', the first device's public key X, and the second device's public key Y.

12. The method of claim 11, wherein calculating a semi-static shared secret S' further comprises calculating: $S'=(x-r)\cdot S+Z'$.

13. The method of claim 1, wherein the hash for computing the shared secret Z further includes a password w.

14. The method of claim 11, wherein
the second device's certificate for a second device extended public key Y' where $Y'=y\cdot G'$,
computing an ephemeral public key R further comprises calculating $R=r\cdot(G+\pi\cdot G')$, where $\pi$ is the hash of a password and the generator G' is an element of a group $\mathbb{G}$, and
computing a semi-static shared secret R' further comprises calculating $R'=r\cdot(Y+\pi\cdot Y')$.

15. The method of claim 14, wherein computing a semi-static shared secret S' comprises calculating $S'=(x-r+\pi)\cdot S+Z'$.

16. A method of generating a shared secret by a second device, wherein the shared secret is shared between a first party-device and the second device, comprising:
randomly generating an ephemeral private key S;
computing an ephemeral public key S based upon the ephemeral private key S and a generator G, where the generator G is an element of a group G;
receiving from the first device an ephemeral public key R;
checking to verify that the ephemeral public key R is an element of the group G;
calculating an ephemeral shared secret Z' based upon the ephemeral private key S and the ephemeral public key R;
encrypting a certificate for the second device's public key Y using a hash of the ephemeral shared secret Z' as an encryption key;
transmitting to the second device the ephemeral public key S and the encrypted certificate for the second device's public key Y;
calculating a semi-static shared secret R' based upon a private key Y of the second user, the ephemeral private key S, the ephemeral public key R, and the ephemeral shared secret Z';
receiving from the first device an encrypted certificate for the first device's public key X;
decrypting the encrypted certificate for the first device's public key using a hash of the semi-static shared secret R' as a decryption key;
checking the certificate for the first device's public key;
computing a semi-static shared secret S' based upon the ephemeral private keys and the first device's public key X; and
computing the shared secret Z as the hash of the ephemeral shared secret Z', the semi-static shared secret R', the semi-static shared secret S', the first device's public key X, and the second device's public key Y.

17. The method of claim 16, wherein calculating a semi-static shared secret R' further comprises calculating: $R'=(y-s)\cdot R+Z'$.

18. The method of claim 16, wherein the hash for computing the shared secret Z further includes a password w.

19. The method of claim 16, wherein
computing an ephemeral public key S further comprises calculating $S=s\cdot(G+\pi\cdot G')$, where $\pi$ is the hash of a password and the generator G' is an element of a group $\mathbb{G}$,
the first device's certificate includes a first device extended public key X' where $X'=x\cdot G'$,
and
computing a semi-static shared secret S' further comprises calculating $S'=s\cdot(X+\pi\cdot X')$.

20. The method of claim 16, wherein
computing an ephemeral public key S further comprises calculating $S=s\cdot G_\pi$, where $G_\pi=G+\pi\cdot G'$, $\pi$ is the hash of a password, and the generator G' is an element of a group $\mathbb{G}$, and
computing a semi-static shared secret S' comprises calculating $S'=s\cdot \tilde{X}_\pi$, where $\tilde{X}_\pi=X+\pi\cdot X'+\pi\cdot G_\pi$ and X' is a first device extended public key where $X'=x\cdot G'$.

* * * * *